United States Patent [19]
Rossin et al.

[11] Patent Number: 5,877,773
[45] Date of Patent: Mar. 2, 1999

[54] MULTI-PASS CLIPPING IN A GEOMETRY ACCELERATOR

[75] Inventors: Theodore G. Rossin; Edmundo Rojas; Glenn W. Strunk, all of Fort Collins, Colo.

[73] Assignee: Hewlett-Packard Company, Palo Alto, Calif.

[21] Appl. No.: 865,902

[22] Filed: May 30, 1997

[51] Int. Cl.$^6$ ................................................ G06F 15/00
[52] U.S. Cl. .............................................................. 345/434
[58] Field of Search ................................... 345/433, 434, 345/117, 118, 121

[56] References Cited

U.S. PATENT DOCUMENTS

| | | | |
|---|---|---|---|
| 4,821,209 | 4/1989 | Hempel et al. | 340/723 |
| 4,888,712 | 12/1989 | Barkans et al. | 364/522 |
| 4,945,500 | 7/1990 | Deering | 364/522 |
| 4,958,305 | 9/1990 | Okazza | 364/522 |
| 5,003,497 | 3/1991 | Priem | 364/522 |
| 5,051,737 | 9/1991 | Akeley et al. | 340/747 |
| 5,079,719 | 1/1992 | Maillot | 395/134 |

FOREIGN PATENT DOCUMENTS

| | | |
|---|---|---|
| 2693012A1 | 6/1992 | France . |
| 2226219 | 6/1990 | United Kingdom . |

*Primary Examiner*—Phu K. Nguyen

[57] ABSTRACT

A system and method for reducing an amount of memory that is needed to perform view clipping and model clipping of an input primitive in a geometry accelerator of a computer graphics system. The method includes view clipping the input graphics primitive with each view clipping boundary to determine a view-clipped geometry, storing view-clipped vertex data defining the view clipped geometry in memory, model clipping a view-clipped triangle forming the view-clipped geometry with each user defined model clipping plane to determine a model-clipped geometry, and storing model-clipped vertex data defining the model-clipped geometry in the memory in the memory locations previously occupied by said view-clipped vertex data. The method is repeated until each view-clipped triangle forming the view-clipped geometry has been model-clipped.

30 Claims, 8 Drawing Sheets

FIG. 5A

VERTEX LOOK UP TABLE

| LIST ENTRY | INITIAL STATE | CLIP Xmin | CLIP Xmax | CLIP Ymin | CLIP Ymax |
|---|---|---|---|---|---|
| I0 |  | V0 | V4 | V4 | V4 |
| I1 |  | V1 | V1 | V6 | V8 |
| I2 |  | V2 | V2 | V7 | V6 |
| I3 |  |  | V5 | V2 | V7 |
| I4 |  |  |  | V5 | V2 |
| I5 |  |  |  |  | V5 |
| I6 |  |  |  |  |  |
| I7 |  |  |  |  |  |
| O0 | V0 | V4 | V4 | V4 | V4 |
| O1 | V1 | V1 | V6 | V8 | V8 |
| O2 | V2 | V2 | V7 | V6 | V6 |
| O3 |  | V5 | V2 | V7 | V7 |
| O4 |  |  | V5 | V2 | V9 |
| O5 |  |  |  | V5 | V10 |
| O6 |  |  |  |  | V5 |
| O7 |  |  |  |  |  |

(I0–I7: INPUT LIST; O0–O7: OUTPUT LIST)

FIG. 5B

VERTEX RAM

| VRAM ENTRY | INITIAL STATE | CLIP Xmin | CLIP Xmax | CLIP Ymin | CLIP Ymax |
|---|---|---|---|---|---|
| VERTEX0 | V0 |  |  |  |  |
| VERTEX1 | V1 |  |  |  |  |
| VERTEX2 | V2 |  |  |  |  |
| VERTEX3 | ----- | ----- | ----- | ----- | ----- |
| VERTEX4 |  | V4 |  |  |  |
| VERTEX5 |  | V5 |  |  |  |
| VERTEX6 |  |  | V6 | V6 |  |
| VERTEX7 |  |  | V7 |  |  |
| VERTEX8 |  |  |  | V8 |  |
| VERTEX9 |  |  |  |  | V9 |
| VERTEX10 |  |  |  |  | V10 |
| VERTEX11 |  |  |  |  |  |

MULTI-PASS CLIPPING IN A GEOMETRY ACCELERATOR

RELATED APPLICATIONS

The following application describes subject matter related to the present invention, and is filed on even date herewith:

"Post-Transformation Clipping In A Geometry Accelerator," by Glenn W. Strunk, Theodore G. Rossin, and Edmundo Rojas, attorney docket number 10961240.

BACKGROUND OF THE INVENTION

1. Field of The Invention

The present invention relates generally to computer graphics and animation systems and, more particularly, to geometry accelerators that perform clipping operations in a computer graphics and animation system.

2. Related Art

Computer graphics systems are commonly used for displaying two- and three-dimensional graphical representations of objects on a two-dimensional video display screen. Current computer graphics systems provide highly detailed representations and are used in a variety of applications.

In a typical computer graphics system an object or model to be represented on the display screen is broken down into a plurality of graphics primitives. Primitives are basic components of a graphics display and may include, for example, points, lines, vectors, and polygons such as triangles and quadrilaterals. Typically, a hardware/software scheme is implemented to render, or draw, the graphics primitives that represent a view of one or more objects being represented on the display screen.

Generally, the primitives of the three-dimensional object to be rendered are defined by a host computer in terms of primitive data. For example, when the primitive is a triangle, the host computer may define the primitives in terms of the coordinates (X, Y, Z, and W) of its vertices, as well as the red, green and blue and alpha (R, G, B and α) color values of each vertex. Additional primitive data may be used in specific applications. Rendering hardware interpolates the primitive data to compute the display screen pixels that represent each primitive, and the R, G, and B color values for each pixel.

The basic components of a computer graphics system typically include a geometry accelerator, a rasterizer, and a frame buffer. The system may also include other hardware such as texture mapping hardware. The geometry accelerator receives primitive data from the host computer that defines the primitives that make up the model view to be displayed. The geometry accelerator performs transformations on the primitive data and may also perform such functions as lighting, clipping, and plane equation calculations for each primitive. The output of the geometry accelerator, referred to as rendering data, is used by the rasterizer and the texture mapping hardware to generate final screen coordinate and color data for each pixel in each primitive. The pixel data from the rasterizer and the pixel data from the texture mapping hardware, if available, are combined and stored in the frame buffer for display on the video display screen.

One of the more complex operations that may be performed by a geometry accelerator is the clipping of graphics primitives. Clipping determines what portion of a graphics primitive is to be displayed in what is known as a "clip region." The clip region can be a two-dimensional area such as a window, or it can be a three-dimensional view volume. The primitives that are displayed in the clip region can be one-dimensional primitives (e.g., points or lines) or two-dimensional primitives (e.g., polygons).

The clipping of graphics primitives to a three-dimensional view volume is termed "view clipping". The three-dimensional view volume is defined by 6 orthogonal clipping planes, for example, Xmax, Xmin, Ymax, Ymin, Zmax, Zmin. View clipping of primitives is required due to the finite size of the video display, but may also be required by downstream hardware rasterizers to prevent overflow of the rasterizer's internal counters. View clipping can also be used to increase performance of the graphics system, as further processing on primitives that lie outside the view volume need not be performed. In addition to performing view clipping, many graphics systems also perform "model clipping" of graphics primitives. Model clipping allows a user to specify one or more model clipping planes that may be used to further restrict the viewing volume or to remove portions of an object or model from view. The commonly available OpenGL® graphics interface requires the graphics systems to support at least 6 model clipping planes. Accordingly, many graphics systems support 6 or more model clipping planes. By removing certain portions of the object or model from view, other areas of the model that were previously hidden from view can be visualized. (OpenGL is a registered trademark of Silicon Graphics, Inc.).

Various techniques have been developed for clipping points, lines, and polygons. Some of these are: Cohen-Sutherland line clipping, parametric line clipping, Weiler polygon clipping, Liang-Barsky polygon clipping, and Sutherland-Hodgman polygon clipping. Of the various techniques for clipping polygons, the Sutherland-Hodgman polygon clipping technique is perhaps the most widely used and generally applicable technique for clipping an input polygon against an arbitrary number of clipping planes. The Sutherland-Hodgman technique can be used to clip an input polygon against an arbitrary number of clipping planes by using the output from a first clip as the input to the next clip, until all clipping planes have been processed. For example, to clip an input polygon against the six orthogonal planes defining a view volume, the Sutherland-Hodgman technique clips each edge of the input polygon (as defined by the vertices of the input polygon) against a first clipping plane of the view volume to generate a first set of output vertices. Each edge of the output polygon defined by the first set of output vertices is then clipped against a second clipping plane of the view volume to generate a second set of output vertices. The resulting polygon defined by the second set of output vertices is then clipped against a third clipping plane and so on, until all of the clipping planes defining the view volume have been processed. The set of output vertices from the last clip then define a geometrically-shaped primitive (simple referred to as a "geometry" herein) that is bounded by the 6 orthogonal clipping planes of the view volume. The other polygon clipping techniques perform similar operations of successively clipping an input polygon against each plane of an arbitrary number of clipping planes.

Each of these conventional clipping techniques involves computationally intensive graphical manipulations, particularly when clipping polygons against a three dimensional clip region, such as a view volume. Although the clipping of graphics primitives may be performed within the geometry accelerator by means of a hardware-based clipping machine, it is frequently performed by the graphics system in software, or in a combination of both software and hardware. For example, the clipping of simple graphics primitives, such as points and lines, is straight-forward and well known in the art, and may be performed by dedicated hardware within the geometry accelerator. However, the clipping of more complex graphics primitives, such as triangles and other polygons, is more complex, and is conventionally performed by software. One reason for performing clipping of complex graphics primitives in software rather than in hardware within the geometry accelerator is that this is where such clipping has been historically performed. Another reason is that hardware implementations are generally more expensive, in terms of development and test time, cost, and risk, than software implementations. As a result, the benefits involved in placing such functionality in hardware clearly did not outweigh the benefits associated with software implementations, particularly since the clipping of graphics primitives is generally performed rarely by the geometry accelerator.

A further reason for performing clipping of more complex graphics primitives in software rather than hardware is due to the amount of hardware that is needed to perform the clipping operations. In particular, in addition to the hardware needed to perform the actual clipping of more complex graphics primitives, such as triangles or polygons, a substantial amount of memory is also needed to store vertex data. For example, each vertex of a graphic primitive may contain up to sixteen 32 bit words (e.g., spatial coordinate data X, Y, Z, and W, color coordinate data R, G, B, and a, and texture data SR, SG, SB, TS, TT, TR, TQ, D). Each time that a complex primitive, for example a triangle, is intersected by a clipping plane, a new vertex can be created. Thus, if the geometry accelerator supports back-to-back view clipping on 6 view clipping planes and model clipping on up to 6 user defined model clipping planes in a conventional manner, then the memory needs to be able to store at least 15 vertices; the 12 potential new vertices, and the original 3 vertices of the triangle.

However, this amount of memory consumes a large amount of surface area within a geometry accelerator. Providing this amount of memory dedicated to storing vertex data for clipping generally requires sacrificing some other function. Although memory dedicated to storing vertex data for clipping does not need to be located within the geometry accelerator, locating this memory elsewhere decreases the speed and efficiency by which clipping is performed. Moreover, the clipping of complex graphics primitives is only a subset of those functions that a geometry accelerator may perform, and such clipping frequently does not need to be performed at all. Accordingly, for each of the above reasons, the clipping of more complex graphics primitives is conventionally performed in software by the graphics system, rather than in hardware within a geometry accelerator.

SUMMARY OF THE INVENTION

The present invention is a clipping machine controller that instructs an associated clipper to overwrite memory locations containing selected view-clipped vertex data with model-clipped vertex data when the clipping machine is performing view and model clipping. Significantly, this reduces the number of memory locations that must be dedicated to clipping functions performed in a geometry accelerator. This reduction in hardware enables clipping of complex primitives that are most frequently encountered (e.g., triangles, quadrilaterals, and vectors) to be performed in hardware rather than software. This, in turn, results in increased speed and efficiency of the computer graphics systems.

According to one aspect of the present invention, a clipping machine for use in a geometry accelerator of a computer graphics system is described. The clipping machine includes a conventional clipper that determines the intersections of edges of a graphics primitive with at least one clipping plane to define a clipped geometry. The clipper stores the resulting clipped vertex data defining the clipped geometry in a memory of the geometry accelerator. The clipped vertex data includes view-clipped vertex data resulting from the intersection of the graphics primitive with at least one view clipping plane, and model-clipped vertex data resulting from the intersection of the graphics primitive with at least one model clipping plane. When the graphics primitive intersects at least one view and at least one model clipping plane, a clipping controller instructs the clipper to overwrite the view-clipped vertex data with the model-clipped vertex data.

According to one embodiment of this aspect of the present invention, when the view-clipped vertex data forms a number of view-clipped triangles, the clipping controller instructs the clipper to model clip each of view clipped triangle and store the resulting view- and model-clipped vertex data in the memory locations previously occupied by the view-clipped vertex data. Thus, for each view-clipped triangle formed by the view-clipped vertex data, the clipping controller instructs the clipper to again determine the intersection of the graphics primitive with the at least one view clipping plane and store the view-clipped vertex data in the memory, as the previous view-clipped vertex data may have been overwritten. After each view-clipped triangle formed by the view-clipped vertex data has been model clipped, the clipping machine processes the next graphics primitive.

Advantageously, the continuous re-utilization of geometry accelerator memory enables the clipping machine to perform most clipping functions (points, lines, vectors, triangles and quadrilaterals) in hardware, thereby achieving significant performance increases over systems which distribute such functionality among hardware and software. Furthermore, this performance increase is achieved with minimal tradeoffs associated with the repeated determination of view-clipped vertex data, as such repetition is performed only when both view and model clipping are required, and only when the view-clipped vertex data forms multiple view clipped triangles.

As may be noted from the above description, when the graphics primitive intersects view clipping planes and model clipping planes, the clipping controller may instruct the clipper to view clip the same graphics primitive a number of times, depending upon the number of view-clipped vertices formed by the view-clipped vertex data. However, re-calculating the view-clipped vertices of the graphics primitive only needs to be performed when the intersection of the edges of the input primitive and the view clipping planes generate a multiple triangles, and then, only when both view clipping and model clipping are required. In the typical case, most graphics primitives will not need to be both view clipped and model clipped. But, the reduction in the amount of memory that is required to both view and model clip a graphics primitive permits the clipping machine to be implemented in hardware within a single geometry accelerator, without sacrificing some other function.

According to another aspect of the present invention, clipped vertex data is written to the memory only when the intersections of the edges of the graphics primitive with a clipping plane generates a new vertex of the clipped geometry. A disadvantage of conventional graphics systems is the amount of data manipulation that is required. For example, when the output vertices formed by clipping the graphics primitive are written into memory after each clipping plane is processed, a significant amount of time can be spent on simply writing clipped vertex data to memory. Each vertex of a graphics primitive can require the writing of up to sixteen 32 bit words for each vertex. However, an advantage of the present invention is that only new vertex data (e.g., that formed by an intersection of an edge of the graphics primitive with a clipping plane) is written into memory, thus dramatically reducing the amount of data manipulation would be conventionally performed. This increase in efficiency is particularly significant when compared to a software clipping implementation that writes clipped vertex data to a main memory of a host computer.

According to another aspect of the present invention, a method of reducing an amount of memory used to store clipped vertex data is described. The method includes view clipping a graphics primitive with at least one view clipping plane to determine a view-clipped geometry, storing view-clipped vertex data defining vertices of the view-clipped geometry in selected locations of a memory, model clipping a view clipped triangle formed by the view-clipped geometry with at least one model clipping plane to determine a model-clipped geometry, and storing model-clipped vertex data defining vertices of the model clipped geometry in at least one of the selected locations of the memory. According to one embodiment, the steps of view clipping the input graphics primitive, storing the view-clipped vertex data, model clipping a view-clipped triangle, and storing the model-clipped vertex data are repeated for each view-clipped triangle formed by the vertices of the view-clipped geometry.

According to another aspect of the present invention, a method of clipping a graphics primitive that intersects at least one view clipping plane and at least one model clipping plane is described. The method includes view clipping the graphics primitive with the at least one view clipping plane to determine a view-clipped geometry, selecting a view-clipped primitive forming a portion of the view-clipped geometry, model clipping the view-clipped primitive with the at least one model clipping plane to determine a view- and model-clipped geometry, and repeating the steps of view clipping, selecting and model clipping for each view-clipped primitive forming the view-clipped geometry.

An advantage of embodiments of the present invention is that memory for storing only 12 vertices are needed to store clipped vertex data, even when each of the 6 view clipping planes and each of the up to 6 user define model clipping planes generates a new vertex. This reduction in the amount of memory allows view clipping and model clipping of complex graphics primitives to be performed within the geometry accelerator, without sacrificing some other function such as lighting, and plane equation calculation. Furthermore, because view clipping and model clipping are performed in hardware, functions that are performed prior to clipping, for example, vertex transformation, can also be performed in hardware, thereby further enhancing the performance of the graphics system. This is because geometry accelerators are frequently pipelined architectures. In such a pipelined architecture one can not perform a first function, such as vertex transformation, and a third function, such as plane equation calculation, without performing the intermediate function of clipping. Thus, by performing view and model clipping within the geometry accelerator, additional functions performed prior to clipping may also be performed, further enhancing the performance of the system.

A further advantage of the present invention is that any of the aforementioned polygon clipping techniques may be used for the actual clipping of polygons, as the present invention is not limited to one particular technique.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings, in which:

FIG. 5 depicts an example of the contents of a vertex look up table and a vertex memory for use in a clipping machine in accordance with an aspect of the present invention;

DETAILED DESCRIPTION

Figure 1:
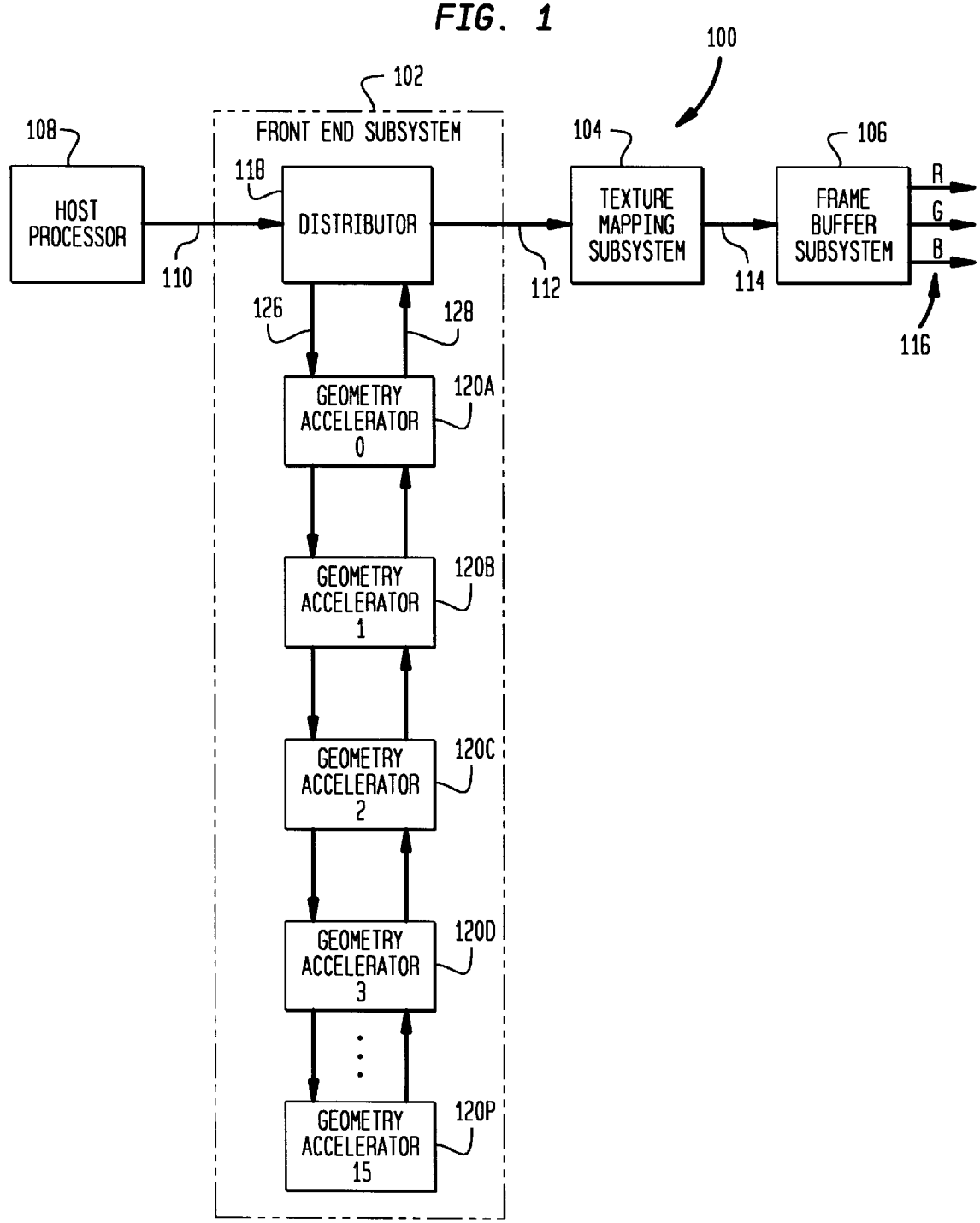
FIG. 1 is a block diagram of an exemplary computer graphics system suitable for incorporating a geometry accelerator according to an embodiment of the present invention.

FIG. 1 is a simplified block diagram of an exemplary computer graphics system 100 suitable for incorporation of a geometry accelerator 120 that includes a clipping machine of the present invention. As shown, the graphics system 100 includes a front-end subsystem 102, a texture mapping subsystem 104 and a frame buffer subsystem 106. The front-end subsystem 102 receives primitives to be rendered from the host computer 108 over bus 110. The primitives are typically specified by X, Y, Z, and W coordinate data, $N_x$, $N_y$, and $N_z$ normal data, R, G, B, and α color data, and S, T, R, and Q texture data for portions of the primitives, such as vertices.

Data representing the primitives in three dimensions is provided by the front-end subsystem 102 to the frame buffer subsystem 106 over bus 112 to the optional texture mapping subsystem 104. The texture mapping subsystem 104 interpolates the received primitive data to compute the screen display pixels that will represent the primitive, and determine its corresponding resulting texture data for each primitive pixel. The resulting texture data is provided to the frame buffer subsystem 106 over one or more buses 114.

The frame buffer subsystem 106 interpolates the primitive data received from the front-end subsystem 102 to compute the pixels on the display screen that will represent each primitive, and to determine object color values and Z values for each pixel. The frame buffer subsystem 106 combines, on a pixel-by-pixel basis, the object color values with the resulting texture data provided from the optional texture mapping subsystem 104, to generate resulting image R, G, and B values for each pixel. R, G, and B color control signals for each pixel are respectively provided over R, G and B lines 116 to control the pixels of the display screen (not shown) to display a resulting image on the display screen that represents the texture-mapped primitive.

The front-end subsystem 102 includes a distributor 118 and one or more three-dimensional geometry accelerators 120A–120P (collectively and generally referred to as geometry accelerators 120). As noted, the distributor 118 receives the coordinate and other primitive data over bus 110 from a graphics application on the host computer 108. The distributor 118 dynamically allocates the primitive data, including vertex state (coordinate) and property state (color, lighting, etc.) data, among the geometry accelerators 120 and provides each geometry accelerator with primitive data over bus 126. Rendering data generated by the geometry accelerators 120 is provided over output bus 128 to distributor 118. Distributor 118 reformats the primitive output data (that is, rendering data) received from the geometry accelerators 120, reorders the rendering data if necessary, performs a floating point to fixed point conversion, and provides the primitive data stream over bus 112 to optional texture-mapping subsystem 104 and subsequently to frame buffer subsystem 106.

The texture mapping subsystem 104 and frame buffer subsystem 106 may be any well-known systems now or later developed. Furthermore, the front-end subsystem 102, texture mapping subsystem 104 and frame buffer subsystem 106 are preferably pipelined and operate on multiple primitives simultaneously. While the texture mapping subsystem 104 and the frame buffer subsystem 106 operate on primitives previously provided by the front-end subsystem 102, the front-end subsystem 102 continues to operate and provide new primitives until the pipelines in the subsystems 104 and 106 become full.

Figure 2:
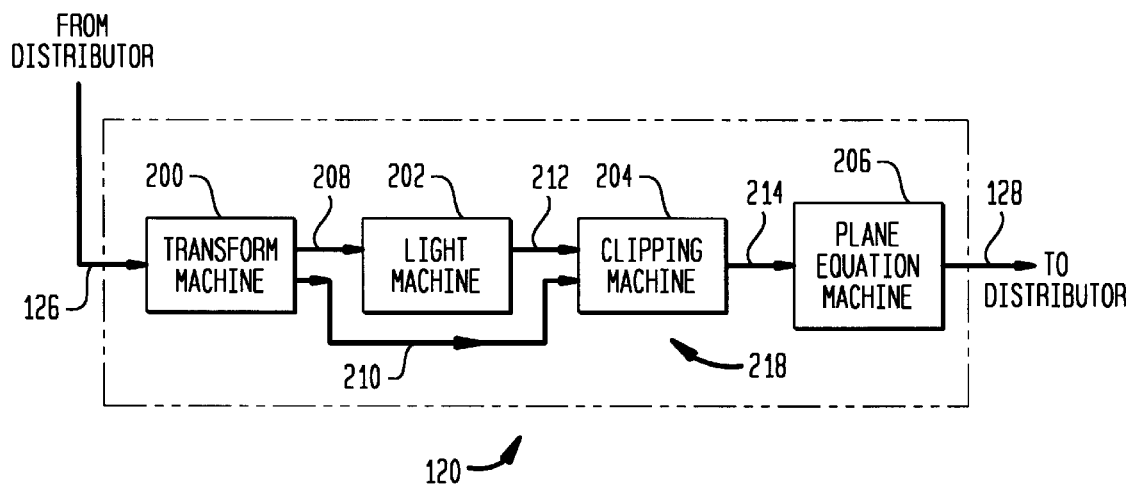
FIG. 2 is a block diagram of a geometry accelerator that includes a clipping machine according to an embodiment of the present invention.

FIG. 2 is a functional block diagram of a geometry accelerator 120 that includes a clipping machine 204 configured in accordance with the present invention. In this illustrative embodiment, the clipping machine 204 supports clipping on 6 view clipping planes and on up to 6 user-defined model clipping planes at any orientation, although additional or fewer model clipping planes may be implemented. As shown, the geometry accelerator 120 includes a number of specialized machines 218, including a transform machine 200, a light machine 202, a clipping machine 204, and a plane equation machine 206. Each of the specialized machines 218 is preferably implemented in cell logic and as separate and distinct state machines. The transform machine 200 receives the primitive vertex data from the distributor 118 over bus 126 and performs transformations on the vertex data, such as scaling or moving a vertex in space. The transform machine 200 also calculates view clip codes and model clip codes for each vertex of a primitive to determine whether the primitive may be trivially accepted or trivially rejected by the clipping machine 204. The calculation of clip codes and the determination of trivial acceptance and rejection is well known in the art and is not described in detail herein.

In brief overview, when the clip codes indicate that each of the vertices of the primitive lie within the clipping volume, then the primitive can be trivially accepted. Alternatively, when the clip codes indicate that each of the vertices of a primitive lie outside of one of the clipping planes of the clipping volume, then the primitive can be trivially rejected. When the primitive is trivially rejected, the transformed vertex data is simply discarded by the transform machine 200 as it is completely outside the clipping boundaries, and a next primitive is processed.

However, when a primitive is not trivially rejected, the transformed vertex data is provided to the light machine 202 via bus 208. Based on the determination of trivial acceptance and rejection, the transform machine 200 provides control information to the clipping machine 204 via lines 210 indicating whether the primitive is to be view clipped, model clipped, view clipped and model clipped, or not clipped at all. The transform machine 200 provides two signals to the clipping machine 204 via lines 210 to control the operation of the clipping machine 204. The first signal, designated view_accept, indicates whether the primitive needs to be view clipped by the clipping machine 204. The second signal, designated model_accept, indicates whether the primitive needs to be model clipped by the clipping machine 204. When the view_accept signal is asserted, the primitive lies completely within the view clipping boundaries and, therefore, does not need to be view clipped. Likewise, when the model_accept signal is asserted, the primitive lies completely inside the model clipping boundaries and, therefore, does not need to be model clipped. When neither signal is asserted, the clipping machine 204 will be used to determine the intersections, if any, of the primitive with both the view clipping boundaries and the model clipping boundaries.

As noted, the light machine 202 receives transformed vertex data for primitives that are not trivially rejected from the transform machine 200 via bus 208. The light machine 202 enhances image data by simulating light conditions, and provides the enhanced vertex data to the clipping machine 204 via bus 212. The clipping machine 204 receives the vertex data from the light machine 202, and determines what form of clipping, if any, is to be performed, on each primitive. The clipping machine 204 clips the primitive to the view clipping boundaries and/or model clipping boundaries and provides clipped (view clipped, model clipped, or both view clipped and model clipped) vertex data to the plane equation machine 206, via bus 214. In the event that the primitive is completely clipped away, that is, when no portion of the primitive is within the clipping boundaries, then no vertex data is provided to the plane equation machine 206. The plane equation machine 206 receives the clipped vertex data from the clipping machine 204 and calculates plane equations defining the clipped primitives in terms of mathematical floating point plane equations. The plane equations defining the clipped primitive are then provided to the distributor 118, wherein the distributor provides the rendering data to the texture mapping subsystem 104, and subsequently to frame buffer subsystem 106.

Figure 3:
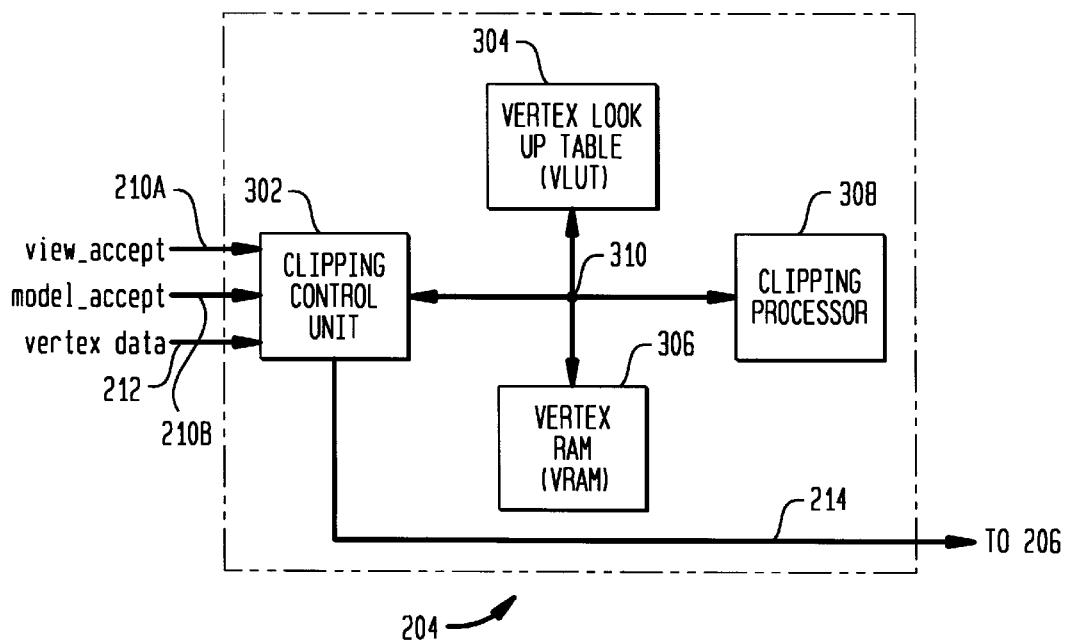
FIG. 3 is a block diagram of a clipping machine according to an embodiment of the present invention.

FIG. 3 is a schematic block diagram of one embodiment of the clipping machine 204 according to the present invention. The clipping machine 204 includes a clipping control unit 302, a vertex look up table (VLUT) 304, a vertex RAM (VRAM) 306, and a clipping processor 308 (hereafter termed "a clipper"). The clipping control unit 302, the VLUT 304, the VRAM 306, and the clipper 308 communicate with each other over bus 310. In a preferred embodiment, the VLUT 304 and the VRAM 306 are fast memory accessible by both the clipping control unit 302 and the clipper 308. The VLUT 304 and the VRAM 306 need not be implemented within the clipping machine 204 as depicted in FIG. 3, but may be located anywhere within the geometry accelerator 120. The clipping control unit 302 receives the control information (view_accept, and model_accept) via lines 210A and 210B, and the light-enhanced vertex data via bus 212, and provides the clipped vertex data to the plane equation machine 206 over bus 214. In a preferred embodiment of the present invention, the clipping machine 204 receives light-enhanced vertex data defining more complex graphics primitives such as lines, triangles, and quadrilaterals, with quadrilaterals being processed as two triangles. The clipping of simple primitives, such as points, can be performed by the transform machine 200 based on clip codes, and need not be performed by the clipping machine 204, while more complex primitives, such as polygons and triangle strips, can broken down into triangles prior to being processed by the clipping machine 204. Accordingly, further description of the clipping machine 204 is primarily described in terms of triangles, although other primitives will be discussed where necessary for a complete understanding.

The clipping control unit 302 stores the light-enhanced vertex data defining the input primitive in VRAM 306, and stores vertex indices corresponding to the vertex data that is stored in the VRAM 306 in the VLUT 304. As described further below, the use of vertex indices and the VLUT 304 dramatically reduces the amount of data manipulation performed by the clipping machine 204. Dependent on the control information received from the transform machine 200 over lines 210, the operation of the clipping control unit 302 will vary. For example, when the control information indicates that no clipping need be performed, the clipping control unit 302 simply provides the light-enhanced vertex data to the plane equation machine 206. This may occur, for example, when the input primitive lies completely within the view clipping boundaries and the model clipping boundaries (if any). Alternatively, when the control information indicates that only one of view clipping, or model clipping is to be performed, the clipping control unit 302 selects the appropriate intersection equations and clip codes for the clipper 308 to use, loads the indices of the vertices that define the input primitive into the VLUT 304, and instructs the clipper 308 to determine the intersections of the input primitive, if any, with the appropriate clipping boundaries. The clipping boundaries are defined by plane equations of the form $Ax+By+Cz+Dw$ for each of the view and/or model clipping planes in a conventional manner. The coefficients (A, B, C, D) that define these planes are stored in predetermined memory locations known to the clipper 308, such as within VRAM 306. Alternatively, they may also be stored in a register location (not shown). The clipper 308 clips the input primitive according to the equations set by the clipping control unit 302, stores clipped vertex data in the VRAM 306, and updates the vertex indices in the VLUT 304 to point to the clipped vertex data. When control is returned to the clipping control unit 302, the clipping control unit 302 provides the clipped vertex data to the plane equation machine 206.

However, when the control information indicates that both view clipping and model clipping are to be performed, the clipping control unit 302 performs both view clipping and model clipping using only a minimal amount of memory in accordance with the present invention. When both view and model clipping is to be performed, the clipper 308 is called to view clip the input primitive and write the view-clipped vertices in the VRAM 306 and update the VLUT 304. The clipper 308 is then called to model clip the view clipped geometry that is defined by the view-clipped vertices and write the model-clipped vertices into the VRAM 306 and update the VLUT 304, whereupon the clipping control unit 302 then provides the model-clipped vertices to the plane equation machine 206. However, when the view-clipped vertices define a polygon (i.e., define one or more view clipped triangles), the clipper 308 will be called a number of times to model clip each view clipped triangle forming the view clipped polygon. Each time that the clipper 308 is called to model clip a view clipped triangle, the view-clipped vertices of the view clipped polygon may be overwritten by the model-clipped vertices. Thus, after the clipping control unit 302 provides the model-clipped vertices to the plane equation machine 206, the clipping control unit 302 will call the clipper 308 to view clip the input primitive, once again writing the view-clipped vertices defining the view clipped polygon in the VRAM 306 and updating the VLUT 304. The clipping control unit 302 will then call the clipper 308 to model clip the next view clipped triangle forming the view clipped polygon, and provide the model-clipped vertices to the plane equation machine 206. This process is repeated until all of the view clipped triangles forming the view clipped polygon have be model clipped and the resulting model-clipped vertices output to the plane equation machine 206, wherein the next input primitive is processed.

As may be noted from the above description, when both view clipping and model clipping are to be performed, the clipping control unit 302 may call the clipper 308 to view clip the same input primitive a number of times, depending upon the number of view-clipped vertices formed by the intersections of the edges of the input primitive with the view clipping boundaries. However, it should be noted that re-calculating the view-clipped vertices of the input primitive is needed only when the intersection of the edges of the input primitive and the view clipping planes generate multiple triangles, and then, only when both view clipping and model clipping are required. In the typical case, most input primitives will not need to be both view clipped and model clipped, as most input primitives will either be trivially accepted or trivially rejected. But, the reduction in the amount of memory that is required to both view and model clip an input primitive permits the clipping machine 204 to be implemented in hardware, and to fit within a single geometry accelerator 120 without sacrificing some other function.

A number of modifications to the above described embodiment can be envisioned. For example, the clipping control unit 302 may include means for determining an amount of VRAM 306 that is designated to storing vertex data for clipping. If the amount of memory for storing vertex data is sufficient to store the view-clipped vertex data and determine the model-clipped vertices without overwriting the view-clipped vertex data, then the clipping control unit 302 need not call the clipper 308 to re-determine the view-clipped vertices. Alternatively, if the amount of memory for storing vertex data is insufficient to store the view-clipped vertex data and determine the model-clipped vertices without overwriting the view-clipped vertex data, then the clipping control unit 302 may proceed as described above. This could be implemented, for example, by means of a register within the clipping control unit 302 that stores the amount of VRAM 306 allocated for clipping.

The clipping control unit can also include means for dynamically determining the amount of memory needed to store vertex data for clipping and compare this to the amount of VRAM 306 that is designated to storing vertex data for clipping. As mentioned previously, when a triangle intersects a clipping plane a new vertex may be created. However, dependent on the number of model clipping planes that have been defined by the user, the number of possible new vertices may be much fewer than six. Accordingly, the clipping control unit can include means for determining a maximum number of possible new vertices that may be created prior to calling the clipper. If the amount of memory for storing vertex data is sufficient to store the view-clipped vertex data and the maximum number of possible new model-clipped vertices without overwriting the view-clipped vertex data, then the clipping control unit 302 need not call the clipper 308 to re-determine the view-clipped vertices. Alternatively, if the amount of memory for storing vertex data is insufficient to store the view-clipped vertex data and the maximum number of possible new model-clipped vertices without overwriting the view-clipped vertex data, then the clipping control unit 302 may proceed as described above.

FIGS. 4 and 5 are used to describe how the use of vertex indices and the VLUT 304 dramatically reduce the amount of data manipulation performed by the clipping machine 204 according to an embodiment of the present invention. Specifically, FIG. 4 illustrates a diagram of a input triangle being clipped to a two-dimensional clipping boundary defined by the planes Xmin, Xmax, Ymin, and Ymax, and FIG. 5 depicts exemplary contents of the VLUT 304 and VRAM 306 during the clipping of the input triangle to the two-dimensional clipping boundary. The clipping of the input triangle V0–V1–V2 is illustrated for convenience in only two dimensions, as the extension to three-dimensions will be apparent to one of ordinary skill in the art. FIG. 4A illustrates the input triangle V0–V1–V2 and the two-dimensional clipping volume 400 defined by 4 clipping planes, and FIGS. 4B–4E illustrate the resulting clipped geometry formed by clipping the input triangle to clipping planes Xmin, Xmax, Ymin, and Ymax, respectively.

As shown in FIG. 5A, a preferred embodiment of the VLUT 304 includes an input list of vertex indices I0–I7, and an output list of vertex indices O0–O7. Preferably each vertex index is a four bit nibble, and for a given vertex, the input and output vertex indices are included in the most significant and least significant portions of a byte. As a result the output vertex indices can be transformed to input indices by shifting the output vertex index by four bits. The VLUT 304 is preferably implemented in a double buffered RAM.

FIG. 5A shows the contents of the VLUT 304 for the initial state as well as subsequent states during which the clipping of the input triangle V0–V1–V2 to each of the 4 clipping planes is performed. Similarly, FIG. 5B illustrates the contents of VRAM 306 initially and during the clipping of triangle V0–V1–V2 to the 4 clipping planes.

When the clipping control unit 302 receives light-enhanced vertex data V0, V1, and V2, the vertex data is written into the VRAM 306 at predetermined locations, and the output list of the VLUT 304 is initialized to point to the memory locations where these vertices may be found. In a preferred implementation, the first four memory locations of the VRAM 306 store the input vertices of the input primitive, and are not overwritten during view and/or model clipping of the input primitive. Four memory locations are reserved for the input vertices, in the event that the input primitive is a quadrilateral. Thus, the clipping control unit 302 always knows the memory locations that containing the original input vertices of the input primitive. During clipping, the clipper 308 may overwrite any vertex locations in memory that are no longer needed, and updates the VLUT 304 to point to the location in the VRAM 306 where the vertex may be found.

Figure 4A:
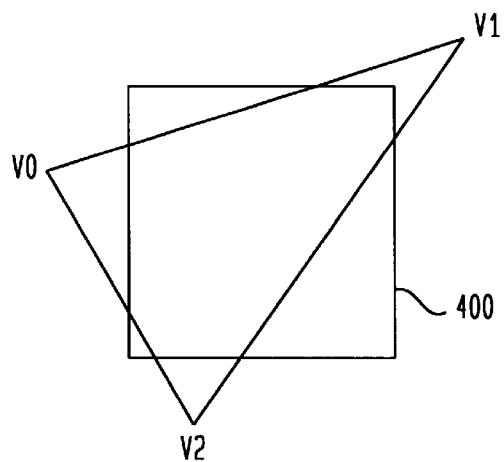
FIG. 4 illustrates a diagram of a input triangle being clipped to a two-dimensional clipping boundary.
Figure 4B:
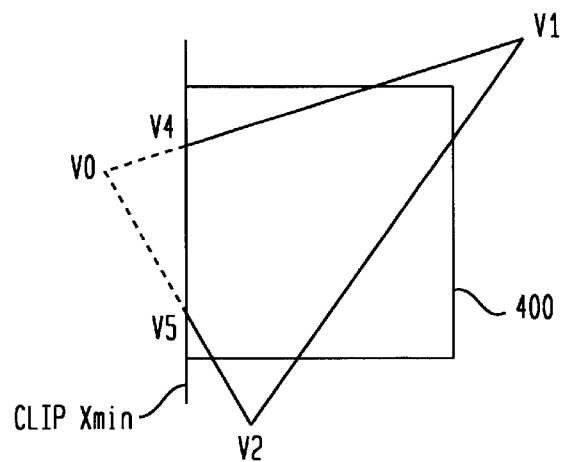
Figure 4C:
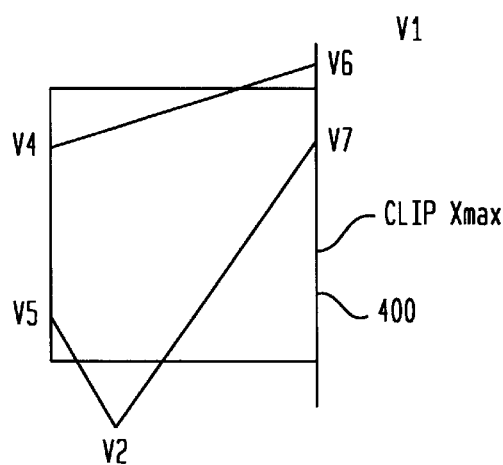
Figure 4D:
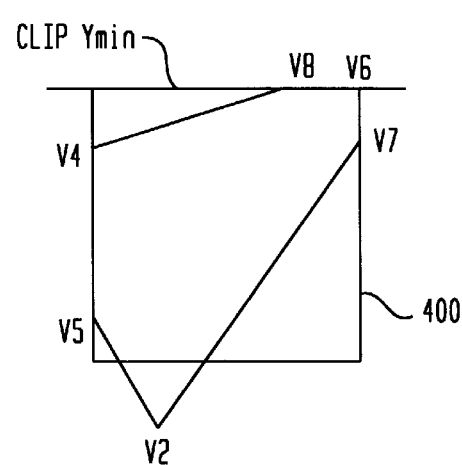
Figure 4E:
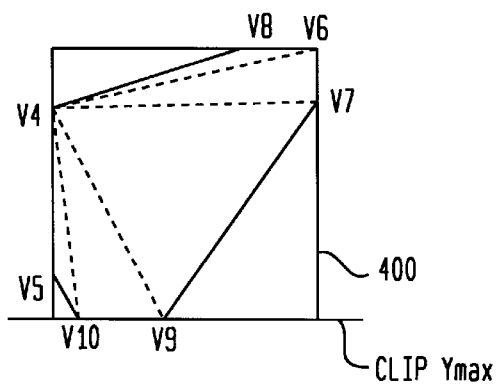

When the clipper 308 is called, the vertices in the output list are shifted into corresponding locations in the input list and the output list is cleared. Thus, as shown in FIG. 5A, the input vertex indices I0–I2 contain vertices V0–V2 in the Clip Xmin column. The clipper 308 determines the intersection of the edges of the input triangle with the clipping plane Xmin, writes the output vertices into the VRAM 306, and updates the vertex indices in the output list of the VLUT 304 to point to the appropriate locations. As shown in FIG. 4B, the intersection of edge V0–V1 results in a new vertex. This new vertex is written into VRAM 306 at any available location (e.g., vertex 4–vertex 11), and an index to this vertex is written into the VLUT 304. As shown in FIGS. 4 and 5, this new intersection value is written into vertex 4, and the output list of the VLUT 304 is updated to point to V4 as the first output vertex (O0). The clipper 308 then processes the next edge V1–V2 of the input triangle. This edge does not intersect the Xmin plane, thus indices V1 and V2 are written into the output list of the VLUT 304 (O1, O2). Because the vertices of V1 and V2 are known, no writing to VRAM 306 is needed. The clipper 308 then processes edge V2–V0 and determines that a new vertex is created. This new intersection value is written into an available memory location (e.g., vertex 5–vertex 11) at vertex 5, and an index to this vertex is written into the output list of the VLUT 304 (V5), and the clipper 308 then processes the next clipping plane.

When clipping plane Xmax is processed, the vertices in the output list (V4, V1, V2, V5) are shifted into corresponding locations in the input list as shown in FIG. 5A, and the output list is cleared. The clipper 308 determines the intersection of edge V4–V1 with the clipping plane Xmax, and writes the output vertices into the VRAM 306 and the output list of the VLUT 304. This results in V4 being written into the output list of the VLUT 304 (no write to VRAM 306 is required) and a new intersection value is written into VRAM 306 at any available location (e.g., vertex 6–vertex 11) for the intersection of edge V4–V1. As the new intersection value was written into vertex 6, an index to this vertex is written into the output list of the VLUT 304. The clipper 308 then processes the next edge V1–V2 and determines that a new intersection value is created. This intersection value is written into vertex 7, and an index to this location is written into the output list of the VLUT 304. The clipper 308 then processes edge V2–V5 and then edge V5–V4, and determines that no new intersection values are created. Thus, no further writing to VRAM 306 is required, the vertices V2 and V5 are written into the output list of the VLUT 304, and the clipper 308 then processes the next clipping plane.

When clipping plane Ymin is processed, the vertices in the output list (V4, V6, V7, V2, V5) are shifted into corresponding locations in the input list, and the output list is cleared. The clipper 308 determines the intersection of edge V4–V6 with the clipping plane Ymin, and writes the output vertices into the VRAM 306 and the output list of the VLUT 304. This results in V4 being written into the output list of the VLUT 304 (no write to VRAM 306 is required) and a new intersection value is written into VRAM 306 at any available location (e.g., vertex 8–vertex 11) for the intersection of edge V4–V6 with the Ymin plane. As the new intersection value was written into vertex 8, an index to this vertex is written into the VLUT 304. The clipper 308 then processes the next edge V6–V7 and determines that a new intersection value is created. This intersection value is written into VRAM 306 at any available location (e.g., vertex 9–vertex 11). However, because the vertex V6 is not one of the original input vertices (e.g., V0–V4), and because this vertex is no longer needed to determine intersections of other edges, this intersection value may also be written to vertex 6. As shown in FIG. 5A, the new intersection value of edge V6–V7 with the Ymin plane is written to vertex 6 and an index to this location is written into the output list of the VLUT 304. The clipper 308 then processes edge V7–V2, then edge V2–V5, and then edge V5–V4, and determines that no new intersection values are created. Thus, no further writing to VRAM 306 is required, the vertices V7, V2, and V5 are written into the output list of the VLUT 304, and the clipper 308 then processes the next clipping plane.

When clipping plane Ymax is processed, the vertices in the output list (V4, V8, V6, V7, V2, V5) are shifted into corresponding locations in the input list, and the output list is cleared. The clipping of the geometry defined by V4–V8–V6–V7–V2–V5 results in two new vertices (V9, V10) being written into the VRAM 306 and the output list of the VLUT 304, whereupon control is returned to the clipping control unit 302. The clipping control unit 302 then outputs the clipped vertices V4, V8, V6, V7, V9, V10, and V5 as triangles (e.g., V5–V10–V4, and V10–V4–V9, etc.) to the plane equation machine 206.

As may be appreciated from the foregoing description, the use of vertex indices and the VLUT 304 dramatically reduce the amount of data manipulation performed by the clipping machine 204. In the example of FIGS. 4 and 5, only 11 writes to VRAM 306 were required, including the writing of the original input vertices. In contrast, were the results of each clip written directly to memory, then 25 writes to memory would have been required, each write including up to 16 32-bit words.

Figure 6:
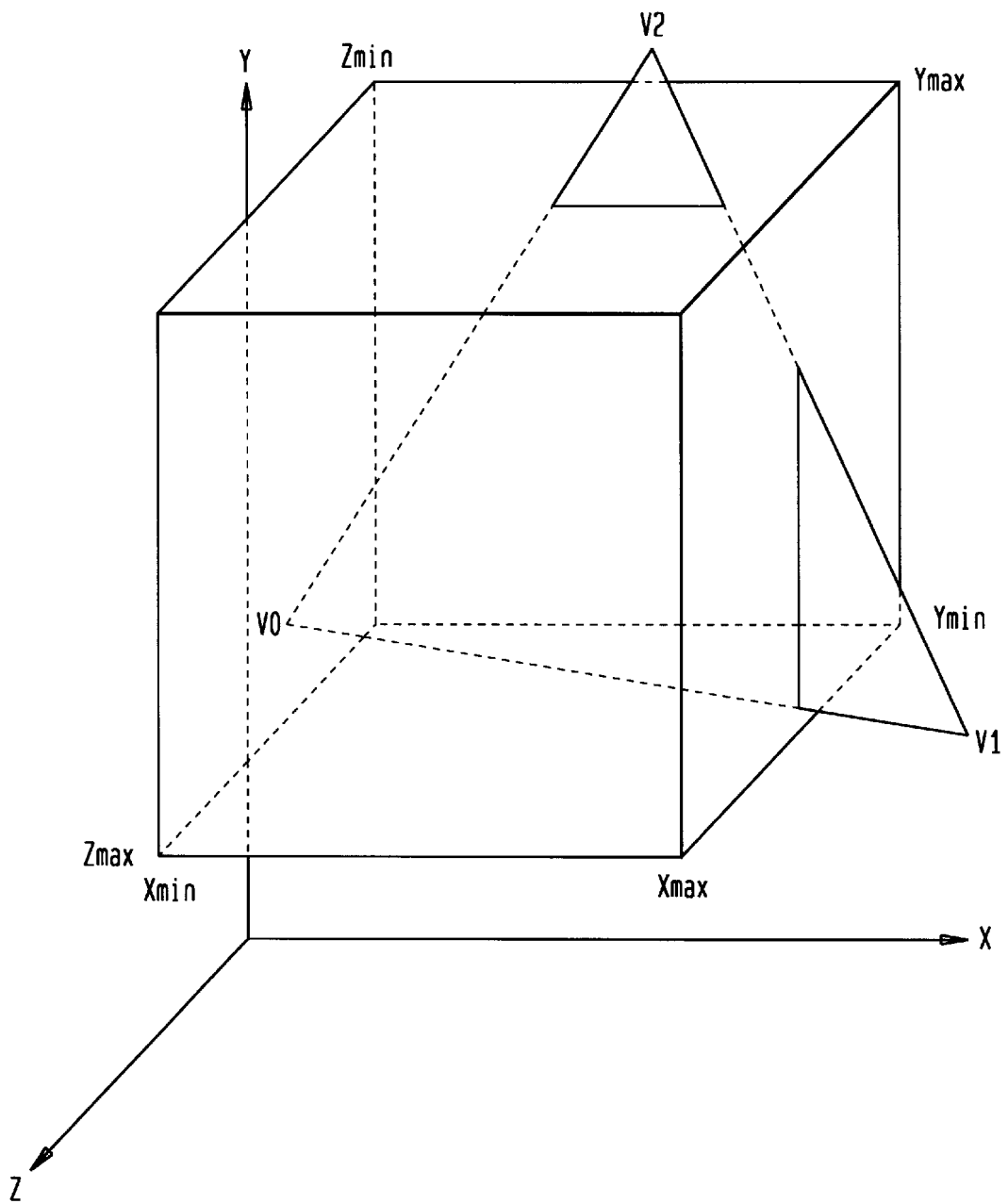
FIG. 6 illustrates a three-dimensional diagram of input triangle defined by vertices that is clipped by 6 orthogonal view clipping planes.
Figure 7:
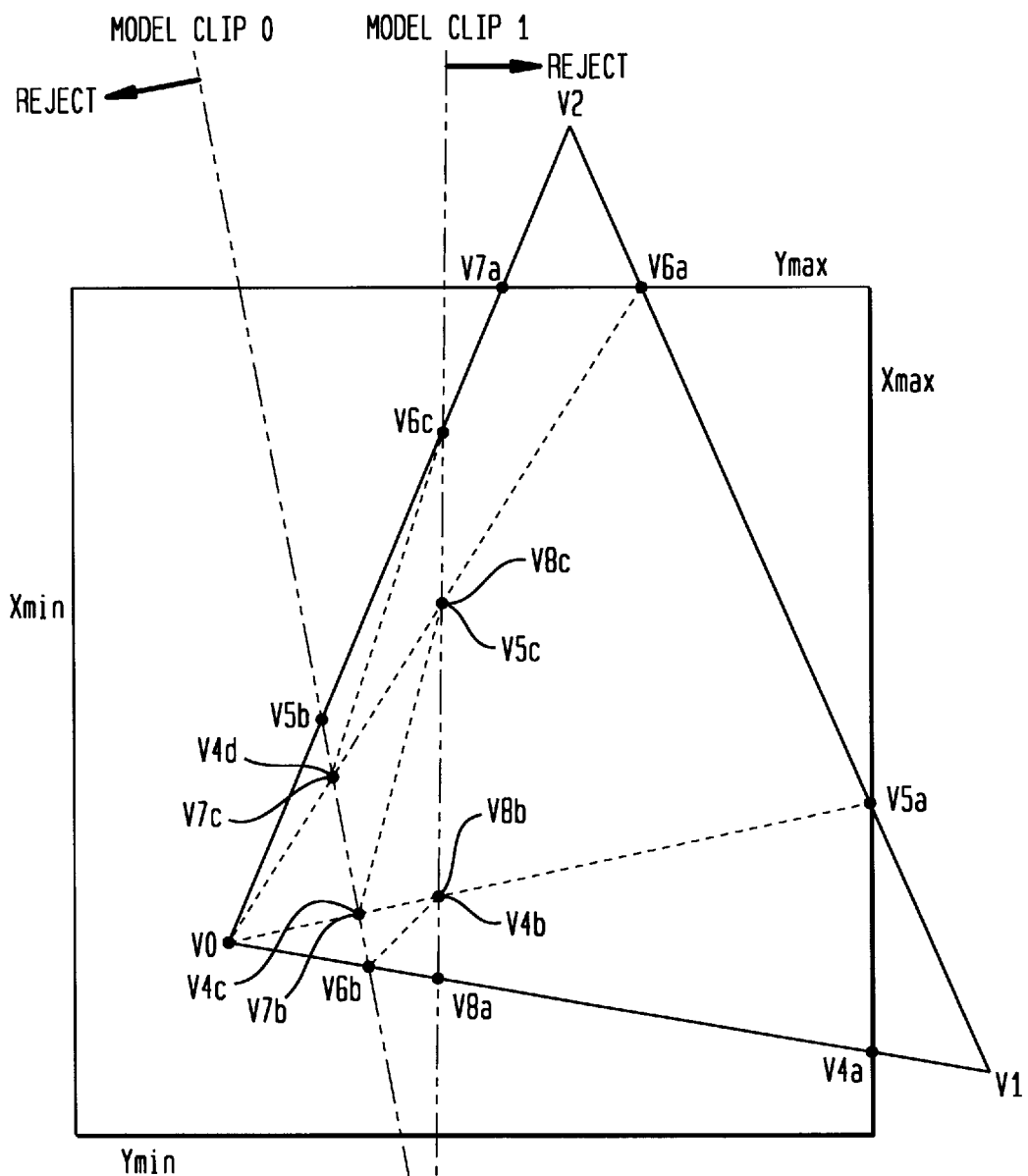
FIG. 7 illustrates a two-dimensional diagram of the input triangle of FIG. 6 that is clipped by view clipping planes and model clipping planes.

FIG. 6 illustrates a three-dimensional diagram of input triangle defined by vertices V0, V1, and V2 that is clipped by 6 orthogonal view clipping planes Xmin, Xmax, Ymin, Ymax, and Zmin and Zmax. FIG. 7 illustrates a two-dimensional diagram of the same input triangle that is model clipped by two user defined model clipping planes, Model Clip 0 and Model Clip 1. As shown in FIG. 7, Model Clip 0 is set to exclude data below and to the left of the clipping plane, and Model Clip 1 is set to exclude data to the right of the plane. FIG. 7 will be used in conjunction with FIGS. 8 and 9 to describe the operation of the clipping machine 204 according to various aspects of the present invention.

Figure 8:
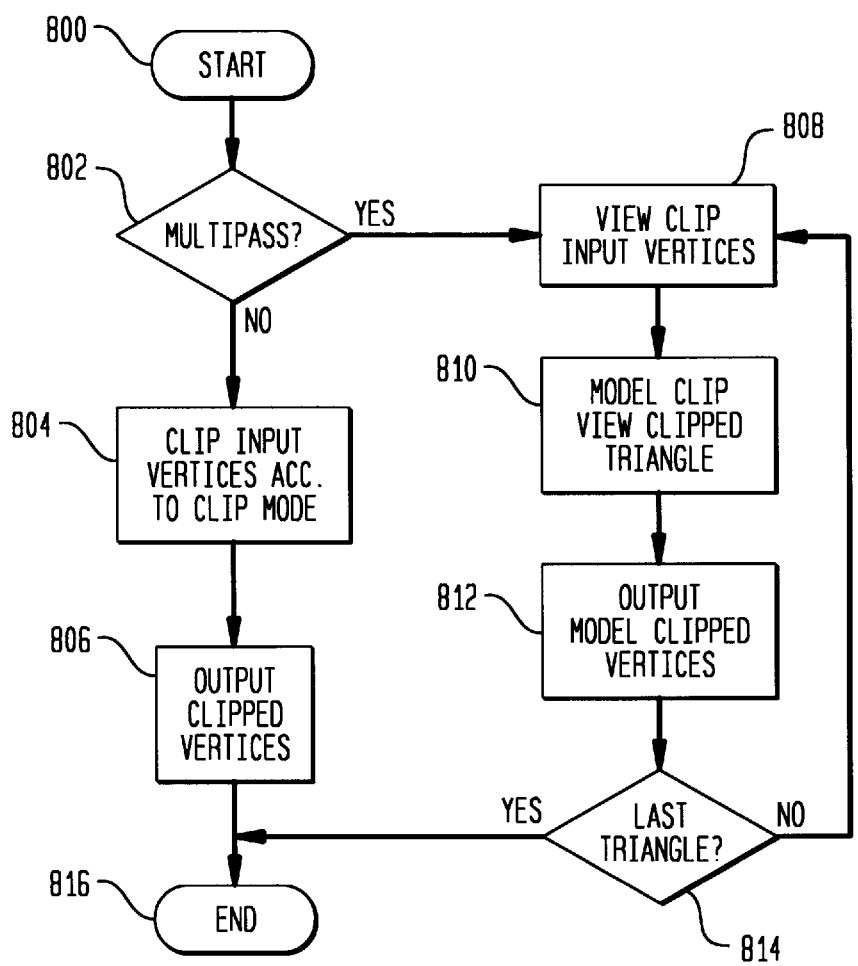
FIG. 8 is a flowchart exemplifying the operation of a clipping machine according to an embodiment of the present invention.

FIG. 8 is a high level flowchart exemplifying the operation of a clipping machine 204 according to an embodiment of the present invention. The clipping control unit 302 receives the light-enhanced vertex data from the light machine 202 and control information from the transform machine 200 at block 800. At block 802 the clipping control unit determines whether a multi-pass clipping routine will be performed based on the state of the control signals view_accept and model_accept. When the control information indicates that the input primitive, in this case the input triangle defined by vertices V0, V1, and V2, is to be view clipped, or model clipped, but not both, the clipping control unit proceeds to block 804. In block 804 the clipper 308 is called and instructed to clip the input triangle according to the mode of clipping specified by the state of control signals view_accept and model_accept. More specifically, when only the view_accept signal is not asserted, the clipper will determine the intersections of the input triangle with each of the view clipping planes based on intersection equations for view clipping. When only the model_accept signal is not asserted, the clipper will determine the intersections of the input triangle with each of the model clipping planes based on intersection equations for model clipping. As is well known to those of ordinary skill in the art, intersection equations are generally different for view clipping and model clipping, even though both generate intersection values based on a method of linear interpolation.

After the clipper has determined the intersection of the input triangle with the appropriate clipping boundaries based on the appropriate intersection equations, the clipping control unit proceeds to block 806, wherein the clipped vertices, if any, are output to the plane equation machine. As noted previously, the clipped output vertices will be output as triangles when the clipped triangle results in a polygon. After providing the clipped output vertices to the plane equation machine, the clipping control unit proceeds to block 816, and processing of the input triangle is finished. Of course, it should be noted that when the control information received by the clipping control unit indicates that the primitive does not require any clipping, then the light-enhanced vertex data may simply be provided to the plane equation machine directly.

Alternatively, when it is determined at block 802 that the control information indicates that the input primitive is to be both view clipped and model clipped, the clipping control unit proceeds to block 808. In block 808 the clipper is called and instructed to view clip the input triangle that is defined by the input vertices, wherein the clipping control unit proceeds to block 810. In block 810, the clipping control unit calls the clipper and instructs the clipper to model clip one of the view clipped triangles defined by the view-clipped vertices, wherein the clipping control unit proceeds to block 812. In block 812, the model-clipped vertices are output to the plane equation machine and the clipping control unit proceeds to block 814. In block 814, a determination is made as to whether there are additional view clipped triangles that have yet to be model clipped. When each view clipped triangle defined by the view-clipped vertices has been model clipped, the clipping control unit proceeds to block 816, and processing of the input triangle is finished. Alternatively, when there are additional view clipped triangles that have yet to be model clipped at block 810 and their model-clipped vertices output at block 812, the clipping control unit returns to block 808. In block 808, the clipping control unit calls the clipper and instructs the clipper to view clip the original input triangle. This step is necessary since the view-clipped vertices may have been overwritten by the clipper at block 810. However, because the input vertices of the triangle are not overwritten until the next input primitive is received, this vertex data is still available to the clipping control unit. After view clipping the original input triangle at block 808, the clipping control unit proceeds to block 810, wherein the clipper is called and instructed to model clip the next view clipped triangle defined by the view-clipped vertices. Blocks 808 through block 812 are repeated until each view clipped triangle has been model clipped and their model-clipped vertices output, wherein the control unit proceeds to block 816. As should be apparent from the above description, when the input primitive is less than a triangle, that is, a line, then only a single pass through blocks 808–812 will be performed. Similarly, even when the input primitive is a triangle, if the view clipping generates three or fewer vertices, then only a single pass through blocks 808–812 will be performed.

The above described operation may be more easily understood with reference to FIG. 7. In FIG. 7, designations a, b, c, etc. are used to distinguish vertices that have been over-written with new vertex data during clipping. For example, when the control information indicates that the input triangle V0–V1–V2 is to be view clipped, the clipping machine will output vertex data defining the view clipped polygon V0–V4a–V5a–V6a–V7a, and the clipper will only be called once, at block 804. Alternatively, when the control information indicates that the input triangle V0–V1–V2 is to be model clipped, the clipping machine will output vertex data defining the model clipped polygon V6b–V8a–V6c–V5b. Once again, the clipper will only be called once at block 804.

However, when the control information indicates that the input triangle V0–V1–V2 is to be both view clipped and model clipped, a multi-pass clipping routine will be performed. For example, the clipping control unit will first call the clipper to determine the intersection of the input triangle V0–V1–V2 with each of the view clipping boundaries. As shown in FIG. 7, the resulting view clipped polygon will be defined by V0–V4a–V5a–V6a–V7a. The clipping control unit will then call the clipper to determine the intersection of one of the triangles formed by the view clipped polygon, for example, view clipped triangle V0–V4a–V5a, with each of the user defined model clipping planes. The vertices of the resulting model clipped polygon V6b–V8a–V4b–V7b will then be output to the plane equation machine as triangles. Because some of the output vertices of the view clipped polygon V0–V4a–V5a–V6a–V7a may have been overwritten by the model clipping (in fact, as illustrated in FIG. 7, vertices V4a, V6a, and V7a have been overwritten), the clipping control unit will call the clipper to re-calculate the view clipped polygon V0–V4a–V5a–V6a–V7a based on the original input vertices V0, V1, and V2. The next view clipped triangle, for instance, triangle V0–V5a–V6a, will then be model clipped against the model clipping planes to generate model clipped polygon V4c–V8b–V5c–V7c, and the vertices output to the plane equation machine as triangles. Because another view clipped triangle remains to be model clipped (V0–V6a–V7a), the clipping control unit will call the clipper to re-calculate the view clipped polygon V0–V4a–V5a–V6a–V7a based on the original input vertices V0, V1, and V2. The last view clipped triangle V0–V6a–V7a will then be model clipped against the model clipping planes to generate model clipped polygon V4d–V8c–V6c–V5b, the vertices output to the plane equation machine, and the routine then terminates.

Figure 9:
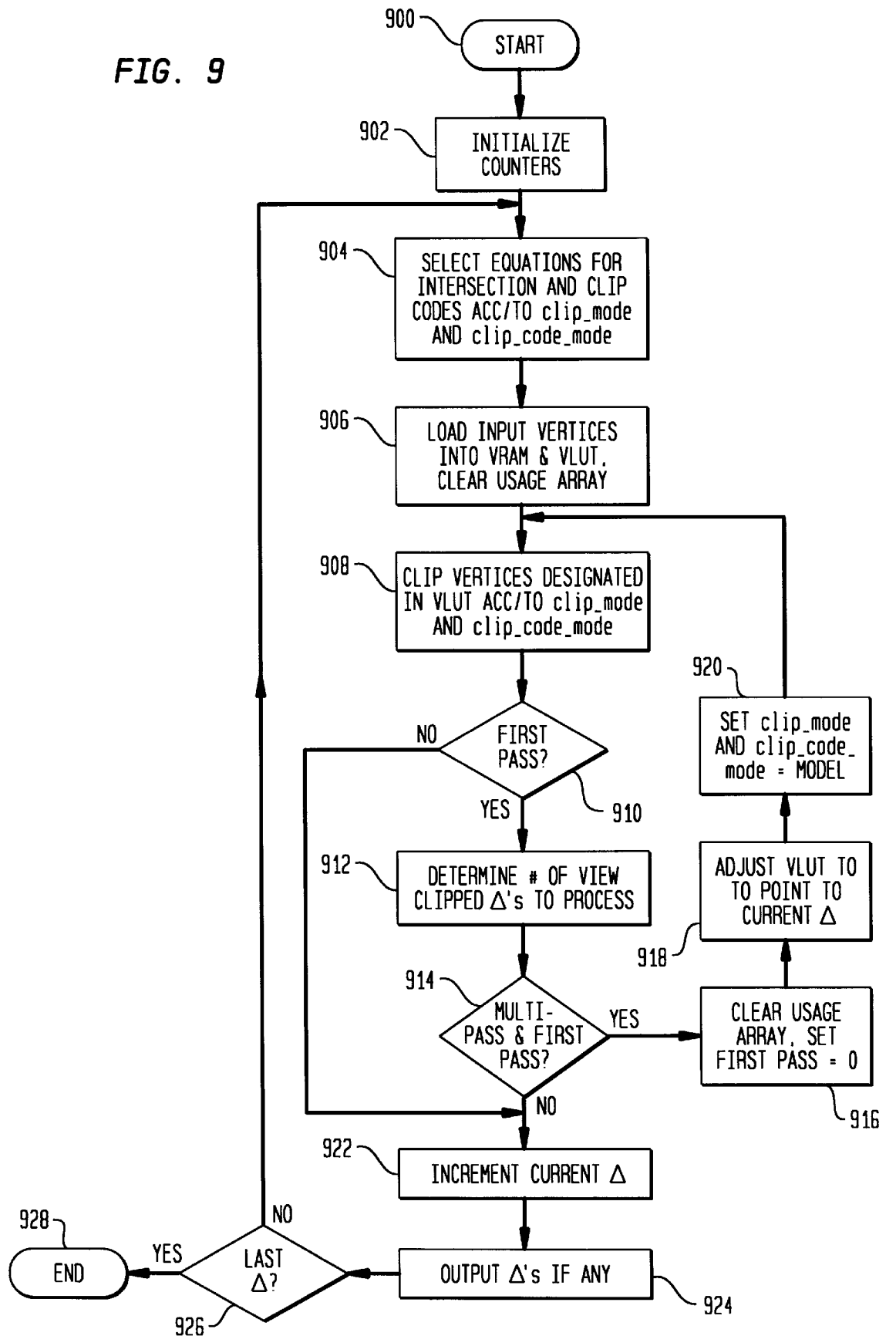
FIG. 9 is a flowchart exemplifying the operation of a clipping machine according to a preferred embodiment of the present invention.

FIG. 9 is a more detailed flowchart exemplifying the operation of a clipping machine 204 according to a preferred embodiment of the present invention. In a preferred embodiment of the present invention, the clipping control unit 302 is implemented as a state machine in cell logic. Of course, such a state machine may also be implemented in any other type of logic mechanism, or in microcode. The clipping control unit receives light-enhanced vertex data from the light machine 202 and control information from the transform machine 200 at block 900. At block 902 the clipping control unit initializes some counters that are used to store variables indicative of the state of the clipping control unit. For example, at block 902, a variable, designated "current triangle", is initialized to indicate which view clipped triangle will be model clipped first, if multiple view clipped triangles are generated. A second variable, designated "first pass", is also initialized to control multi-pass clipping, if multi-pass clipping is required. At block 902, current triangle is set to 1 to indicate that the first view clipped triangle will be model clipped first, and first pass is set to 1 to indicate that this is the first pass through the clipper.

At block 904, the clipping control unit selects the intersection equations and the clip code equations that will be used by the clipper based on the state of two variables, designated clip_mode and clip_code_mode. The variable clip_mode equals the variable view_accept (clip_mode=view_accept), except when explicitly set by the clipping control unit, and the variable clip_code_mode equals the logical AND of view_accept and the inverse model_accept (clip_code_mode=view_accept AND NOT model_accept), except when explicitly set by the clipping control unit. When clip_code_mode=0, then view clipping equations are used to determine the intersections of the input primitive, and when clip_code_mode=1, then model clipping equations are used to determine the intersections of the input primitive. Similarly, when clip_code_mode=0, then clip codes are calculated based on view clip codes, and when clip_code_mode=1, then clip codes are calculated based on model clip codes.

As illustrated in FIG. 7, the input triangle V0–V1–V2 intersects both view clipping boundaries and model clipping boundaries, therefore, control signal view_accept will be 0, and the control signal model_accept will also be 0. Thus, for the input triangle V0–V1–V2, clip_mode and clip_code_mode will both be set to VIEW. After selecting the equations for intersections and clip codes, the clipping control unit proceeds to block 906. At block 906, the clipping control unit loads the input vertices of the original input triangle (for example, triangle V0–V1–V2 in FIG. 7) into the VRAM 306 and updates the vertex indices in output list of the VLUT 304 to point to the appropriate locations in VRAM. The clipping control unit also clears a usage array to allow the clipper to overwrite any vertex locations in VRAM other than those of the original input vertices. After loading the input vertices of the original input triangle into the VRAM, updating the VLUT, and clearing the usage array, the clipping control unit proceeds to block 908, wherein the clipping control unit calls the clipper 308 to clip the vertices designated in the output list of the VLUT (e.g., the input triangle V0–V1–V2) according to clip_mode and clip_code_mode. The result of this clipping is a new list of clipped vertices in the VLUT and the corresponding vertex data stored in VRAM.

The clipping control unit then proceeds to block 910 wherein a determination is made as to whether this is the first pass through the clipper. Because the variable first pass is true, the clipping control unit proceeds to block 912, wherein the number of view clipped triangles that will be model clipped is determined. This determination may be made based upon the number of vertices in the output list of the VLUT. For instance, when the number of output vertices is 4, then two triangles will be model clipped. In the present example, the VLUT contains pointers to 5 vertices, V0, V4a, V5a, V6a, V7a, and thus, the number of view clipped triangles to be processed will be 3. In general, the number of view clipped triangles to be processed will equal the number of view-clipped vertices minus two.

At block 914, the clipping control unit determines whether multi-pass clipping is required and whether this is the first pass through the clipper. Multi-pass clipping is determined based on a variable designated "multi-pass", that is true when both view clipping and model clipping are required. That is, the variable multi-pass equals the logical AND of NOT view_accept and NOT model_accept. Because multi-pass clipping is required, and because this is the first pass through the clipper, the clipping control unit proceeds to block 916. At block 916, the clipping control unit clears the usage array to allow the clipper to overwrite any vertex locations in VRAM other than those of the original input vertices, and sets the variable first pass equal to 0. At block 918, the clipping control unit adjusts the VLUT to point to the vertices of the current triangle (e.g. V0–V4a–V5a), the clipping control unit then proceeding to block 920. At block 920, the clipping control unit sets the variables clip_mode and clip_code_mode to 1 so that the next time the clipper is called, the clipper will use model clipping equations to determine intersections and clip codes, the clipping control unit then proceeding to block 908.

At block 908, the clipping control unit calls the clipper to clip the vertices designated in the output list of the VLUT (e.g., the view clipped triangle V0–V4a–V5a) according to clip_mode and clip_code_mode. The result of this clipping is a new list of clipped vertices in the VLUT (e.g., V6b, V8a, V4b, V7b) and the corresponding vertex data stored in VRAM. The clipping control unit then proceeds to block 910 wherein a determination is made as to whether this is the first pass through the clipper. Because the variable first pass is false, the clipping control unit proceeds to block 922, wherein the variable indicating the current triangle is incremented to point to the second view clipped triangle. At block 924, the model-clipped vertices, if any, are output to the plane equation machine. As noted previously, the model clipped output vertices (V6b, V8a, V4b, V7b) are output as triangles. After providing the clipped output vertices to the plane equation machine, the clipping control unit proceeds to block 926, wherein a determination is made as to whether the last view clipped triangle has been model clipped and the resulting model-clipped vertices output to the plane equation machine. This determination may be made by comparing the value of the variable current triangle to the number of view clipped triangles determined at block 912. When last view clipped triangle has been model clipped and the resulting model-clipped vertices output to the plane equation machine, processing of the input triangle is complete, and the next input primitive will be processed. Alternatively, and as in this example, when additional view clipped triangles remain to be processed, the clipping control unit returns to block 904.

At block 904, the clipping control unit again selects the intersection equations and the clip code equations that will be used by the clipper based on the state of clip_mode and clip_code_mode. As in the first time through the routine, the variables clip_mode and clip_code_mode will be based on the state of the control signals view_accept model_accept. Thus, for the input triangle V0–V1–V2, clip_mode and clip_code_mode will again be set to VIEW. After selecting the equations for intersections and clip codes, the clipping control unit proceeds to block 906. At block 906, the clipping control unit loads the input vertices of the original input triangle (e.g., V0, V1, V2) into the VRAM and sets the vertex indices in output list of the VLUT to point to the appropriate locations in VRAM. In fact, because the original input vertices are not overwritten in VRAM, the clipping control unit simply updates the vertex indices in the VLUT to point to the original input vertex data for V0, V1, and V2 in VRAM. As noted previously, the vertices of the original view clipped polygon (V0–V4a–V5a–V6a–V7a) may have been, and in this case were, overwritten during model clipping.

After updating the VLUT, the clipping control unit proceeds to block 908, wherein the clipping control unit calls the clipper to clip the vertices designated in the output list of the VLUT (e.g., the input triangle V0–V1–V2) according to clip_mode and clip_code_mode. The result of this clipping is a new list of clipped vertices in the VLUT (e.g., V0, V4a, V5a, V6a, V7a) and the corresponding vertex data stored in VRAM. The clipping control unit then proceeds to block 910 wherein a determination is made as to whether this is the first pass through the clipper. Because the variable first pass is true, the clipping control unit proceeds to block 912, wherein the number of view clipped triangles that will be model clipped is again determined. Once again, the number of view clipped triangles to be processed will be 3, and clipping control unit proceeds to block 914.

At block 914, the clipping control unit again determines whether multi-pass clipping is required and whether this is the first pass through the clipper. Because multi-pass clipping is required and because this is the first pass through the clipper, the clipping control unit proceeds to block 916. At block 916, the clipping control unit clears the usage array to allow the clipper to overwrite any vertex locations in VRAM other than those of the original input vertices, and sets the variable first pass equal to 0. At block 918, the clipping control unit adjusts the VLUT to point to the vertices of the current triangle (e.g., V0–V5a–V6a), the clipping control unit then proceeding to block 920. At block 920, the clipping control unit sets the variables clip_mode and clip_code_mode to 1 so that the next time the clipper is called, the clipper will use model clipping equations to determine intersections and clip codes, the clipping control unit then proceeding to block 908.

At block 908, the clipping control unit calls the clipper to clip the vertices designated in the output list of the VLUT (e.g., the view clipped triangle V0–V5a–V6a) according to clip_mode and clip_code_mode. The result of this clipping is a new list of clipped vertices in the VLUT (e.g., V4c, V8b, V5c, V7c) and the corresponding vertex data stored in VRAM. The clipping control unit then proceeds to block 910 wherein a determination is made as to whether this is the first pass through the clipper. Because the variable first pass is false, the clipping control unit proceeds to block 922, wherein the variable indicating the current triangle is incremented to point to the third, and last, view clipped triangle. At block 924, the model-clipped vertices, if any, are output to the plane equation machine. After providing the clipped output vertices to the plane equation machine, the clipping control unit proceeds to block 926, wherein a determination is made as to whether the last view clipped triangle has been model clipped and the resulting model-clipped vertices output to the plane equation machine. Because an additional view clipped triangle (e.g., V0–V6a–V7a) remains to be processed, the clipping control unit returns to block 904.

The clipping control unit proceeds through blocks 904–916 as before, again re-calculating the view clipped polygon V0–V4a–V5a–V6a–V7a. At block 918, the clipping control unit adjusts the VLUT to point to the vertices of the current triangle (e.g., V0–V6a–V7a), the clipping control unit then proceeding to block 920. At block 920, the clipping control unit sets the variables clip_mode and clip_code_mode to 1 so that the next time the clipper is called, the clipper will use model clipping equations to determine intersections and clip codes, the clipping control unit then proceeding to block 908.

At block 908, the clipping control unit calls the clipper to clip the vertices designated in the output list of the VLUT (e.g., the view clipped triangle V0–V6a–V7a) according to clip_mode and clip_code_mode. The result of this clipping is a new list of clipped vertices in the VLUT (e.g., V4d, V8c, V6c, V5b) and the corresponding vertex data stored in VRAM. The clipping control unit then proceeds to block 910 wherein a determination is made as to whether this is the first pass through the clipper. Because the variable first pass is false, the clipping control unit proceeds to block 922, wherein the variable indicating the current triangle is incremented. At block 924, the model-clipped vertices V4d, V8c, V6c, V5b are output to the plane equation machine, the clipping control unit proceeding to block 926. At block 926, the clipping control unit determines that all view clipped triangles have been processed and the resulting model-clipped vertices output to the plane equation machine, and the processing of the input triangle is complete.

In the preferred embodiment of the present invention described with respect to FIG. 9, the clipping machine 204 is provided with light-enhanced vertex data. Of course, it should be appreciated by one of ordinary skill in the art that the clipping machine 204 may instead be provided with vertex data provided directly from the transform machine, whereupon clipped vertex data may then be provided to the light equation machine. Moreover, in the preferred embodiment described with respect to FIG. 9, the clipper 308 is provided with light-enhanced vertex data or view clipped light-enhanced vertex data directly via the VLUT 304 and the VRAM 306, independent of whether the clipper is to perform view clipping or model clipping. This is possible because in the preferred embodiment described with respect to FIG. 9, view clipping and model clipping are both performed in the same coordinate space. However, if view clipping and model clipping are defined in different coordinate spaces, as in a conventional graphics system, then a transformation of the vertex data to be used by the clipper can be provided which is dependent on the mode of clipping that is to be performed and the coordinate space in which the vertex data is received by the clipping machine.

As described with respect to FIG. 9, the clipping of the input triangle V0–V1–V2 required a number of passes through the clipper. However, it should again be emphasized that in many cases, an input primitive will not require both view and model clipping. Moreover, in many cases that do require both view and model clipping, the input primitive may be a line, in which case the clipper would only be called twice; once for view clipping, and once for model clipping. Alternatively, even when the input primitive is a more complex primitive, such as a triangle, the determination of the intersections of a view clipped polygon with the user-defined model clipping planes may not be required. This is simply because the clipper will first determine whether the view clipped primitive may be trivially accepted or trivially rejected, based on the model clip codes of the view-clipped vertices defining the view clipped polygon. Thus, when the view clipped primitive can be trivially accepted or rejected, the clipper will simply update the VLUT to point to the original view-clipped vertices (trivial acceptance), or will update the VLUT to indicate that no vertices remain (trivial rejection).

It should be understood that various changes and modifications of the embodiments shown in the drawings and described in the specification may be made within the spirit and scope of the present invention. In particular, although embodiments of the present invention have been described with respect to the Sutherland-Hodgman polygon clipping technique, other polygon clipping techniques, such as Weiler polygon clipping, Liang-Barsky polygon clipping, etc. may also be used. Moreover, it should be readily apparent to one of ordinary skill in the art that the clipping routine described with respect to FIG. 9 may also be performed on vertex data defining more complex input primitives, such as a polygon, by processing the more complex primitive as a number of triangles. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A clipping machine for use in a geometry accelerator of a computer graphics system, the geometry accelerator including a memory, the clipping machine comprising:

a clipper for determining intersections of edges of a graphics primitive with at least one clipping plane and for storing clipped vertex data defining a clipped geometry in the memory, said clipper storing view-clipped vertex data in said memory when the graphics primitive intersects at least one view clipping plane and storing model-clipped vertex data in said memory when the graphics primitive intersects at least one model clipping plane; and clipping control means for instructing said clipper to overwrite the view-clipped vertex data with the model-clipped vertex data.

2. The clipping machine of claim 1, wherein said clipping control means comprises:

means for instructing said clipper to overwrite the view-clipped vertex data with the model-clipped vertex data when the graphics primitive intersects said at least one view clipping plane and said at least one model clipping plane.

3. The clipping machine of claim 1, wherein said clipping control means comprises:

means for selecting equations used by said clipper to determine the intersections of edges of the graphics primitive with said at least one clipping plane.

4. The clipping machine of claim 1, wherein said clipping control means comprises:

vertex data management means for reducing a number of writes to the memory to store said clipped vertex data when said at least one clipping plane includes a plurality of clipping planes.

5. The clipping machine of claim 4, wherein said vertex data management means comprises:

means for writing clipped vertex data in the memory only when said intersections of edges of the graphics primitive generate a new vertex of the clipped geometry.

6. The clipping machine of claim 1, wherein said clipping control means comprises:

means for determining a minimum number of view-clipped triangles formed by the view-clipped vertex data.

7. The clipping machine of claim 6, wherein said clipping control means further comprises:

means for selecting one of said minimum number of view-clipped triangles; and means for instructing said clipper to determine intersections of edges of said one view-clipped triangle with said at least one model clipping plane.

8. The clipping machine of claim 7, wherein said clipping control means further comprises:

means for instructing said clipper to determine intersections of edges of each of said minimum number of view-clipped triangles with said at least one model clipping plane.

9. The clipping machine of claim 1, wherein the memory includes predetermined locations for storing vertex data defining the graphics primitive, and wherein said clipping control means comprises:

means for instructing said clipper to store the clipped vertex data in the memory at locations other than said predetermined locations.

10. The clipping machine of claim 1, wherein said clipping control means is implemented as a state machine using cell logic.

11. The clipping machine of claim 1, wherein said clipping control means comprises:

means for selecting clip code equations used by said clipper to determine whether the view-clipped vertex data intersects the at least one model clipping plane.

12. The clipping machine of claim 1, wherein said clipping control means comprises:

means for determining an amount of said memory that is dedicated to storing said clipped vertex data, and wherein said clipping control means instructs said clipper to overwrite said view-clipped vertex data with said model-clipped vertex data when said amount of dedicated memory is insufficient for storing said view-clipped vertex data and said model-clipped vertex data.

13. The clipping machine of claim 12, wherein said clipping control means further includes:

means for determining an amount of the memory that is dedicated to storing said clipped vertex data; and means for dynamically determining an amount of the memory that is sufficient for storing said view-clipped vertex data and said model-clipped vertex data;

wherein said clipping control means instructs said clipper to overwrite said view-clipped vertex data with said model-clipped vertex data when said amount of dedicated memory is less than said amount dynamically determined memory.

14. A method of reducing an amount of memory used to store clipped vertex data, the method comprising the steps of:

(a) view clipping a graphics primitive with at least one view clipping plane to determine a view clipped geometry;

(b) storing view-clipped vertex data defining vertices of said view clipped geometry in selected locations of a memory;

(c) model clipping a view clipped triangle formed by the vertices of said view-clipped geometry with at least one model clipping plane to determine a model-clipped geometry; and (d) storing model-clipped vertex data defining vertices of said model clipped geometry in at least one of said selected locations of the memory.

15. The method of claim 14, further comprising a step of:

(e) repeating steps (a) through (d) for each view-clipped triangle formed by said vertices of said view-clipped geometry.

16. The method of claim 14, further comprising a step of:

(e) storing vertex data defining vertices of said graphics primitive in predetermined locations of the memory other than said selected locations.

17. The method of claim 14, further comprising steps of:

(e) determining a number of view-clipped triangles formed by said vertices of said view clipped geometry; and (f) repeating steps (a) through (d) for each of said number of view-clipped triangles formed by said vertices of said view-clipped geometry.

18. The method of claim 14, wherein said step (b) comprises the step of:

(1) writing said view-clipped vertex data to said selected locations of the memory only when an intersection of said graphics primitive with said at least one view clipping plane generates a new view clipped vertex.

19. The method of claim 14, wherein said step (d) comprises the step of:

(1) writing said model-clipped vertex data to said at least one of said selected locations of the memory only when an intersection of said view-clipped triangle with said at least one model clipping plane generates a new model clipped vertex.

20. The method of claim 14, further comprising a step of:

(e) selecting equations to determine an intersection of said graphics primitive with said at least one view clipping plane.

21. The method of claim 14, further comprising steps of:

(e) determining a number of view-clipped triangles formed by said vertices of said view clipped geometry;

(f) selecting one view-clipped triangle of said number of view-clipped triangles; and (g) providing vertex data defining said vertices of said one view-clipped triangle to a clipper to determine said model-clipped geometry.

22. A method of clipping a graphics primitive that intersects at least one view clipping plane and at least one model clipping plane, the method comprising the steps of:

(a) view clipping said graphics primitive with said at least one view clipping plane to determine a view-clipped geometry;

(b) selecting a view-clipped primitive forming a portion of said view-clipped geometry;

(c) model clipping said view-clipped primitive with said at least one model clipping plane to determine a view- and model-clipped geometry; and (d) repeating said steps of (a) through (c) for each view-clipped primitive forming said view clipped geometry.

23. The method of claim 22, further comprising a step of:

(e) determining a number of view-clipped triangles forming said view-clipped geometry.

24. The method of claim 23, wherein said step (a) comprises the step of:

(1) selecting one of said number of view-clipped triangles as said view clipped primitive.

25. The method of claim 24, wherein said step (e) comprises the step of:

(1) determining a minimum number of view-clipped triangles forming said view clipped geometry.

26. The method of claim 22, wherein said step (a) comprises the step of:

(1) storing vertex data defining said view-clipped geometry in selected locations of a memory; and wherein said step (d) comprises the step of:

(1) storing vertex data defining said view- and model-clipped geometry in at least one of said selected locations of said memory.

27. The method of claim 26, further comprising the step of:

(e) storing vertex data defining said graphics primitive in said memory at locations other than said selected locations.

28. The method of claim 27, wherein said step (a)(1) comprises the step of:

(a) writing said vertex data into said selected locations of the memory only when an intersection of the graphics primitive and said at least one view clipping plane generates a new vertex.

29. The method of claim 22, further comprising the step of:

(e) selecting equations to determine an intersection of the graphics primitive with said at least one view clipping plane.

30. A clipping machine for use in a geometry accelerator of a computer graphics system, the geometry accelerator including a memory, the clipping machine comprising:

a clipper for determining intersections of edges of a graphics primitive with at least one clipping plane and for storing clipped vertex data defining a clipped geometry in the memory, said clipper storing view-clipped vertex data in said memory when the graphics primitive intersects at least one view clipping plane and storing model-clipped vertex data in said memory when the graphics primitive intersects at least one model clipping plane; and a clipping controller for instructing said clipper to overwrite the view-clipped vertex data with the model-clipped vertex data, including, means for instructing said clipper to overwrite the view-clipped vertex data with the model-clipped vertex data when the graphics primitive intersects said at least one view clipping plane and said at least one model clipping plane, means for selecting equations used by said clipper to determine the intersections of edges of the graphics primitive with said at least one clipping plane, and means for selecting clip code equations used by said clipper to determine whether the view-clipped vertex data intersects the at least one model clipping plane.

\* \* \* \* \*

UNITED STATES PATENT AND TRADEMARK OFFICE
CERTIFICATE OF CORRECTION

PATENT NO. : 5,877,773
DATED : March 2, 1999
INVENTOR(S) : Theodore G. Rossin et al.

It is certified that error appears in the above-identified patent and that said Letters Patent is hereby corrected as shown below:

<u>Column 3,</u>
Line 27, delete "a" and insert therefor -- α --

Signed and Sealed this

Eleventh Day of June, 2002

Attest:

Attesting Officer

JAMES E. ROGAN
Director of the United States Patent and Trademark Office